United States Patent
Zeng

(10) Patent No.: US 11,184,693 B2
(45) Date of Patent: Nov. 23, 2021

(54) DUST SCREEN ASSEMBLY, ELECTROACOUSTIC ASSEMBLY, HOUSING ASSEMBLY, AND ELECTRONIC DEVICE

(71) Applicant: GUANGDONG OPPO MOBILE TELECOMMUNICATIONS CORP., LTD., Guangdong (CN)

(72) Inventor: Yuanqing Zeng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 171 days.

(21) Appl. No.: 16/622,865

(22) PCT Filed: Jul. 5, 2017

(86) PCT No.: PCT/CN2017/091899
§ 371 (c)(1),
(2) Date: Dec. 13, 2019

(87) PCT Pub. No.: WO2019/006706
PCT Pub. Date: Jan. 10, 2019

(65) Prior Publication Data
US 2020/0213691 A1     Jul. 2, 2020

(51) Int. Cl.
*H04R 25/00*      (2006.01)
*H04R 1/02*       (2006.01)
(Continued)

(52) U.S. Cl.
CPC ............. *H04R 1/023* (2013.01); *B08B 17/02* (2013.01); *H01F 7/081* (2013.01);
(Continued)

(58) Field of Classification Search
CPC ...... H04R 1/023; H04R 1/0266; H04R 9/025; H04R 1/086; H04R 1/025; H04R 9/06; H04R 1/02; H04R 7/08
See application file for complete search history.

(56) References Cited

U.S. PATENT DOCUMENTS 7,170,190 B1    1/2007 Treur
10,750,287 B2 *  8/2020 Lippert ................. H04R 1/023
(Continued)

FOREIGN PATENT DOCUMENTS

CN    201821610 U    5/2011
CN    204018350 U    12/2014
(Continued)

OTHER PUBLICATIONS

International Search Report in the international application No. PCT/CN2017/091899, dated Mar. 23, 2018.
(Continued)

*Primary Examiner* — Amir H Etesam
(74) *Attorney, Agent, or Firm* — Ladas & Parry, LLP

(57) ABSTRACT

A dust screen assembly (100), an electroacoustic assembly (200), a housing assembly (300), and an electronic device (1000). The dust screen assembly (100) comprises: a magnet (1), having a first magnetic field; a coil (2), suitable for generating a second magnetic field; brush heads (3), disposed in the coil (2) and connected to the coil (2); and a dust screen (4), located on one side of the coil (2) distant from the magnet (1). When the direction of the second magnetic field and the direction of the first magnetic field are opposite, the coil (2) moves towards the dust screen (4), and the brush heads (3) are suitable for making contact with the dust screen (4). When the direction of the second magnetic field and the direction of the first magnetic field are same, the coil (2) moves towards the magnet (1).

20 Claims, 9 Drawing Sheets

(51) Int. Cl.
  *B08B 17/02* (2006.01)
  *H01F 7/08* (2006.01)
  *H04M 1/02* (2006.01)
  *H04R 1/08* (2006.01)
  *H04R 9/02* (2006.01)
  *H04R 9/06* (2006.01)

(52) U.S. Cl.
  CPC .......... *H04M 1/0266* (2013.01); *H04R 1/025* (2013.01); *H04R 1/086* (2013.01); *H04R 9/025* (2013.01); *H04R 9/06* (2013.01)

(56) References Cited

U.S. PATENT DOCUMENTS

| | | |
|---|---|---|
| 2015/0195655 A1 | 7/2015 | Fan |
| 2016/0277841 A1 | 9/2016 | Slotte |

FOREIGN PATENT DOCUMENTS

| | | |
|---|---|---|
| CN | 104320940 A | 1/2015 |
| CN | 105744781 A | 7/2016 |
| CN | 105978132 A | 9/2016 |
| CN | 106596810 A | 4/2017 |
| CN | 107318072 A | 11/2017 |
| CN | 206835374 U | 1/2018 |

OTHER PUBLICATIONS

Written Opinion of the International Search Authority in the international application No. PCT/CN2017/091899, dated Mar. 23, 2018 with English translation provided by Google Translate.
Supplementary European Search Report in the European application No. 17916878.6, dated Apr. 29, 2020.
Office Action of the Indian application No. 201917049096, dated Apr. 23, 2021.
English translation of the Written Opinion of the International Search Authority in the international application No. PCT/CN2017/091899, dated Mar. 23, 2018.

\* cited by examiner ns.com/us/en/2017/10/01/2017/10/01/2017/10/01-1/
DUST SCREEN ASSEMBLY, ELECTROACOUSTIC ASSEMBLY, HOUSING ASSEMBLY, AND ELECTRONIC DEVICE

CROSS-REFERENCE TO RELATED APPLICATIONS

The application is a national phase application of International Patent Application No. PCT/CN2017/091899, filed on Jul. 5, 2017, the content of which is hereby incorporated by reference in its entireties.

TECHNICAL FIELD

The disclosure relates to the technical field of electronic devices, and in particular to a dust-proof screen assembly, an electroacoustic assembly, a housing assembly, and an electronic device.

BACKGROUND

In the related art, a dust-proof screen of an electronic device is easily clogged after being used for a long time, and it is necessary to clean dust on the dust-proof screen after the clogging.

SUMMARY

The disclosure aims to solve at least one of the technical problems existing in the conventional art. To this end, the disclosure provides a dust-proof screen assembly that has the advantage of convenient cleaning.

The disclosure also provides an electroacoustic assembly of an electronic device. The electroacoustic assembly may include the above dust-proof screen assembly.

The disclosure also provides a housing assembly of an electronic device. The housing assembly of an electronic device may include the above electroacoustic assembly of an electronic device.

The disclosure also provides an electronic device. The electronic device may include the above housing assembly of an electronic device.

The dust-proof screen assembly according to an embodiment of the disclosure may include: a magnet, having a first magnetic field; a coil, located on one side of the magnet and configured to generate a second magnetic field; a brush head, disposed in the coil and connected to the coil, an end face of the brush head extending beyond an end face of the coil; and a dust-proof screen, located on one side of the coil away from the magnet. When the direction of the second magnetic field is opposite to the direction of the first magnetic field, the coil may move toward the dust-proof screen, and the brush head may be adapted to contact with the dust-proof screen. When the direction of the second magnetic field is the same as the direction of the first magnetic field, the coil may move toward the magnet.

The electroacoustic assembly of an electronic device according to an embodiment of the disclosure may include: the above dust-proof screen assembly; and a vibrating assembly disposed between the magnet and the coil. An end face of the vibrating assembly faces toward the coil being provided with a groove.

The housing assembly of an electronic device according to an embodiment of the disclosure may include the above electroacoustic assembly of an electronic device.

The electronic device according to an embodiment of the disclosure may include the above housing assembly of an electronic device.

Additional aspects and advantages of the disclosure will be set forth in part in the following description. Some will become apparent from the following description, or will be understood by the practice of the disclosure.

BRIEF DESCRIPTION OF DRAWINGS

The above and/or additional aspects and advantages of the disclosure will become apparent and readily understood from the description of the embodiments in conjunction with the accompanying drawings, where.

LIST OF REFERENCE SYMBOLS

Figure 1:
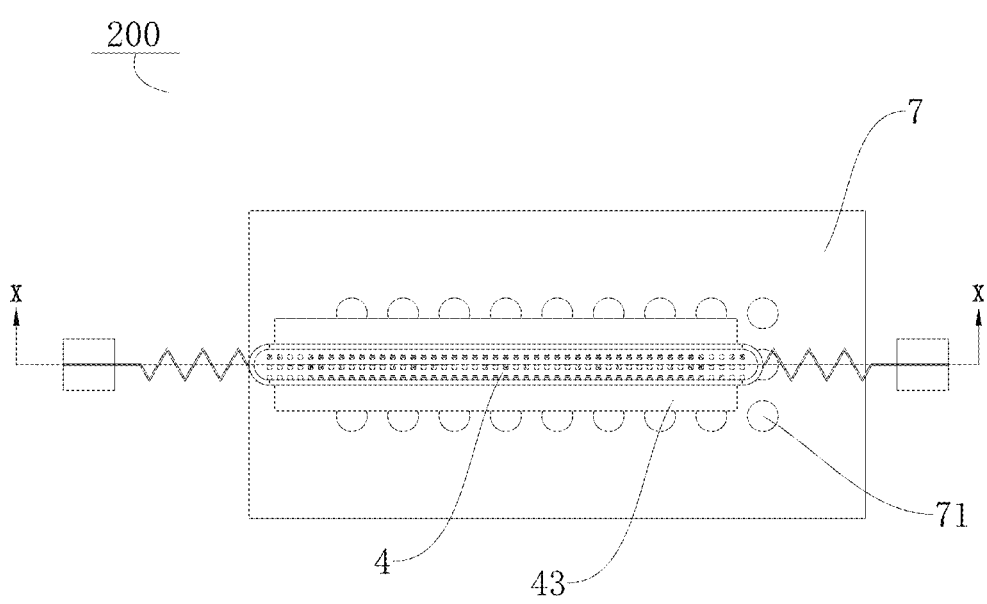
FIG. 1 is a top view of an electroacoustic assembly according to an embodiment of the disclosure.

1000: Electronic device,
100: Dust-proof screen assembly,
1: Magnet,
2: Coil,
3: Brush head,
4: Dust-proof screen,
41: Baffle,
42: Mounting space,
43: Mounting portion,
5: Bracket,
51: Slot,
52: Through groove,
200: Electroacoustic assembly,
6: Vibrating assembly,
61: Groove,
7: Limiting member,
71: Through hole,
300: Housing assembly.

DETAILED DESCRIPTION

The embodiments of the disclosure are described in detail below, and the examples of the embodiments are illustrated in the drawings, where the same or similar reference numerals are used to refer to the same or similar elements or elements having the same or similar functions. The embodiments described below with reference to the drawings are only intended to be illustrative of the disclosure and are not to be construed as limiting the disclosure.

In the descriptions of the disclosure, it is to be understood that an orientation or positional relationship indicated by the terms "center", "transverse", "length", "width", "up", "down", "left", "right", "vertical", "top", "bottom", "inside", "outside", "circumference" and the like is an orientation or positional relationship illustrated in the drawings, and is merely for the convenience of describing the disclosure and simplifying the description, rather than indicating or implying that the device or elements referred to have a particular orientation, and configure and operate for the particular orientation. Thus, it cannot be construed as limiting the disclosure. In addition, a feature defined by "first" and "second" may explicitly or implicitly indicate inclusion of one or more of such feature. In the descriptions of the disclosure, "multiple" means two or more unless otherwise stated.

In the descriptions of the disclosure, it is to be understood that unless otherwise specified and limited, terms "mounting", "mutual connection" and "connection" should be generally understood. For example, the term may be fixed connection or detachable connection or integral connection, the term may be mechanical or electrical connection, and the term may be direct connection or indirect connection through an intermediate or communication inside two elements. Those of ordinary skill in the art can understand specific implications of the above terms in the disclosure in specific situations.

A dust-proof screen assembly 100 according to an embodiment of the disclosure will be described below with reference to the descriptions of FIG. 1 to FIG. 9.

As illustrated in FIG. 1 to FIG. 8, the dust-proof screen assembly 100 according to an embodiment of the disclosure includes a magnet 1, a coil 2, a brush head 3, and a dust-proof screen 4.

Figure 5:
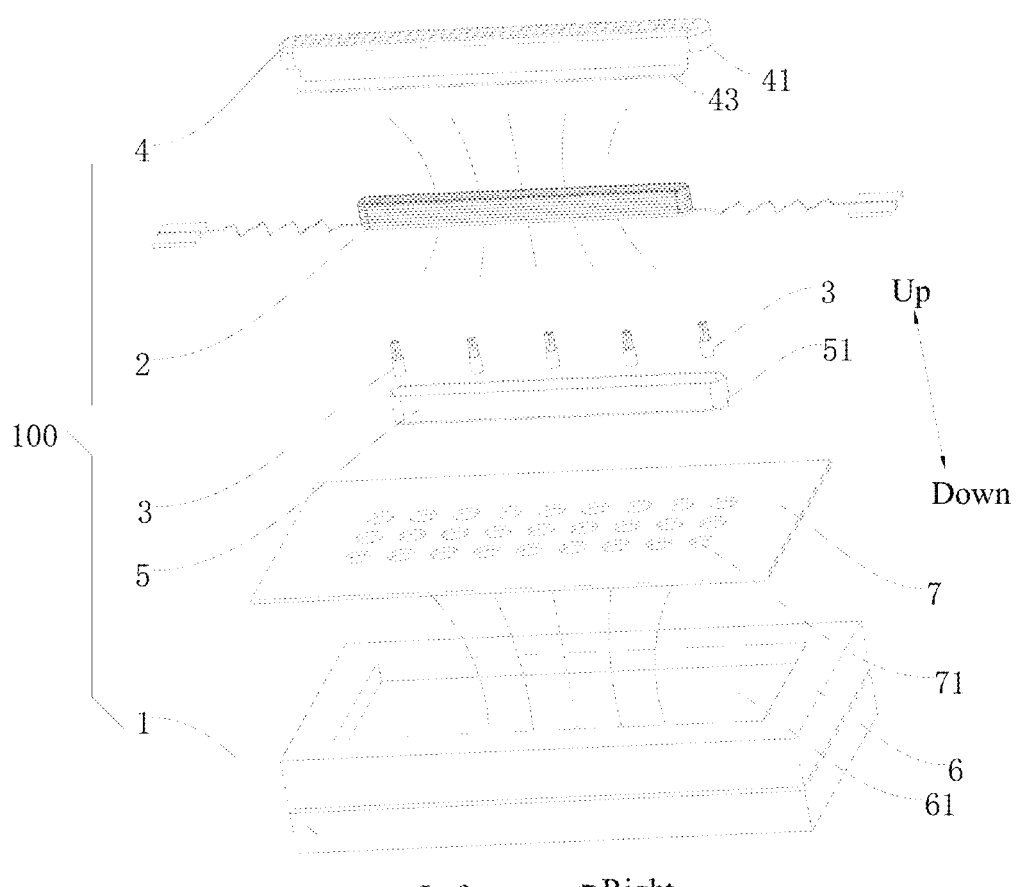
FIG. 5 is an exploded view of an electroacoustic assembly according to an embodiment of the disclosure.
Figure 6:
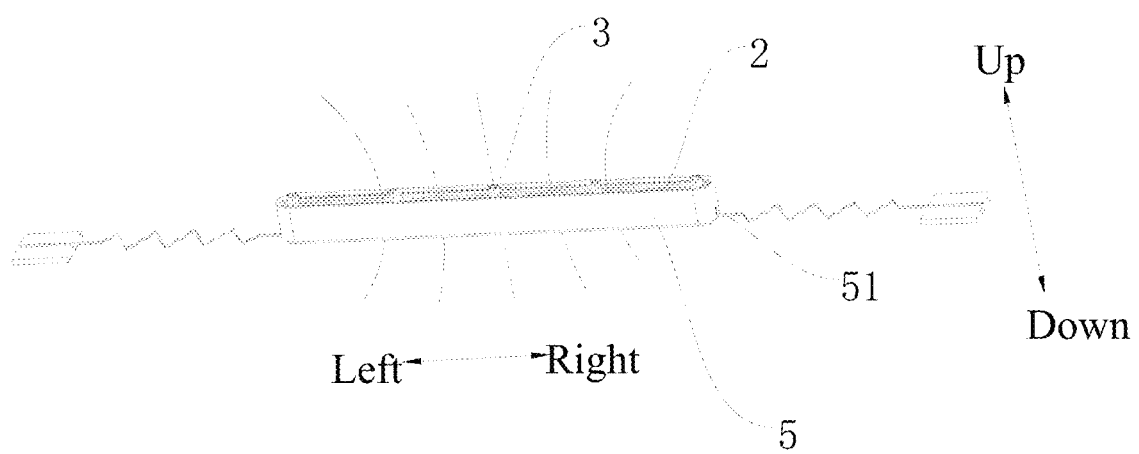
FIG. 6 is a three-dimensional view of a partial structure of an electroacoustic assembly according to an embodiment of the disclosure.
Figure 7:
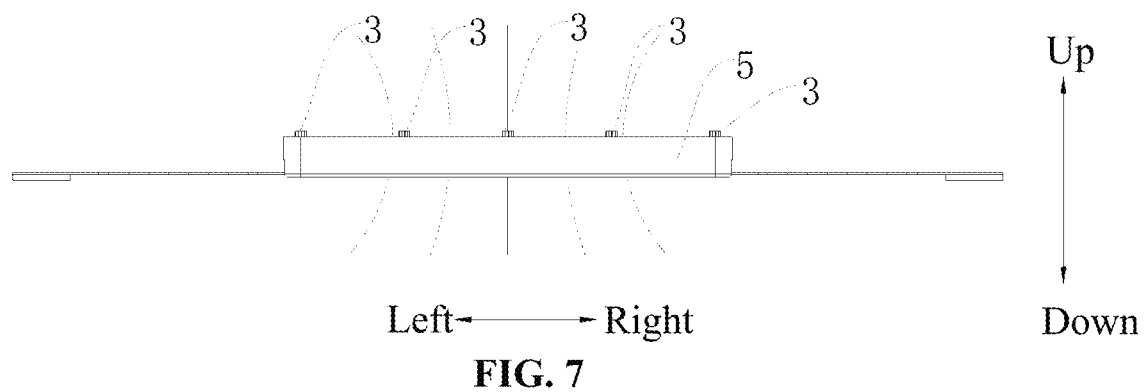
FIG. 7 is a front view of a partial structure of an electroacoustic assembly according to an embodiment of the disclosure.

Specifically, the magnet 1 has a rectangular parallelepiped shape, and the magnet 1 has a first magnetic field. The coil 2 is located on one side of the magnet 1 (upper side as illustrated in FIG. 5), and the coil 2 is adapted to generate a second magnetic field. The brush head 3 is disposed in the coil 2 and connected to the coil 2, and an end face of the brush head 3 extends beyond an end face of the coil 2. For example, as illustrated in FIG. 6 and FIG. 7, an upper end face of the brush head 3 extends beyond an upper end face of the coil 2. The dust-proof screen 4 is located on one side of the coil 2 away from the magnet 1. For example, as illustrated in FIG. 5, the dust-proof screen 4 is located on an upper side of the coil 2.

When the direction of the second magnetic field and the direction of the first magnetic field are opposite, the coil 2 moves toward the dust-proof screen 4, and the brush head 3 is suitable for making contact with the dust-proof screen 4. When the direction of the second magnetic field is the same as the direction of the first magnetic field, the coil 2 moves toward the magnet 1. Therefore, the movement of the brush head 3 may be realized by changing the direction of the second magnetic field, for example, the movement in a vertical direction as illustrated in FIG. 5. When the brush head 3 is in contact with the dust-proof screen 4, the brush head 3 may clean the dust-proof screen 4 in the vertical direction. The brush head 3 may reciprocate in the vertical direction to achieve the purpose of thoroughly cleaning the dust-proof screen 4, thereby avoiding the phenomenon of hole clogging, and improving the quality of an electronic device 1000 while avoiding manual cleaning of the dust-proof screen 4 and reducing after-sales costs.

It is to be noted that the second magnetic field generated by the coil 2 may be generated by supplying the coil 2 with a current. When the current is supplied to the coil 2 and the current flows in a first direction, the direction of the second magnetic field is opposite to the direction of the first magnetic field. When the current is supplied to the coil 2 and the current flows in a second direction opposite to the second direction, the direction of the second magnetic field is the same as the direction of the first magnetic field. Of course, the disclosure is not limited thereto, and the second magnetic field generated in the coil 2 may be induced by other magnetic fields. A control software may be used to control whether the second magnetic field is generated in the coil 2 and the direction in which the second magnetic field is generated, and to perform a periodical cleaning.

The dust-proof screen assembly 100 according to an embodiment of the disclosure is provided with the magnet 1 and the coil 2 disposed on one side of the magnet 1. The brush head 3 connected to the coil 2 is disposed in the coil 2. The dust-proof screen 4 is disposed on one side of the coil 2 away from the magnet 1. The magnet 1 has the first magnetic field, and the coil 2 is adapted to generate the second magnetic field. When the direction of the second magnetic field is opposite to the direction of the first magnetic field, the coil 2 moves toward the dust-proof screen 4, and the brush head 3 is adapted to contact with the dust-proof screen 4. When the direction of the second magnetic field is the same as the direction of the first magnetic field, the coil 2 moves toward the magnet 1. Therefore, the movement of the brush head 3 may be realized by changing the direction of the second magnetic field. When the brush head 3 is in contact with the dust-proof screen 4, the brush head 3 may clean the dust-proof screen 4 in the vertical direction. The brush head 3 may reciprocate in the vertical direction to achieve the purpose of thoroughly cleaning the dust-proof screen 4, thereby avoiding the phenomenon of hole clogging, and improving the quality of an electronic device 1000 while avoiding manual cleaning of the dust-proof screen 4 and reducing after-sales costs.

According to some embodiments of the disclosure, a central line a of the coil 2 coincides with a central line b of the magnet 1. Therefore, when the direction of the second magnetic field is opposite to the direction of the first magnetic field, the coil 2 may be quickly driven to move toward the dust-proof screen 4, and the brush head 3 is adapted to come into contact with the dust-proof screen 4 to clean the dust-proof screen 4. When the direction of the second magnetic field is the same as the direction of the first magnetic field, the coil 2 moves toward the magnet 1, and the coil 2 extends in a straight line during the movement, so that the brush head 3 may be accurately aligned with the dust-proof screen 4 to clean the dust-proof screen 4.

Figure 8:
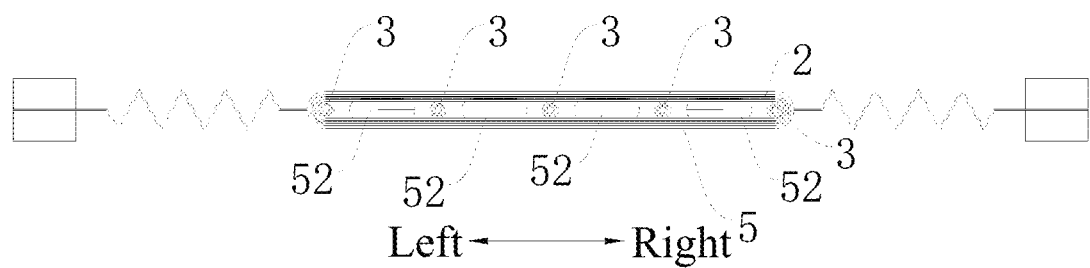
FIG. 8 is a top view of a partial structure of an electroacoustic assembly according to an embodiment of the disclosure.
Figure 9:
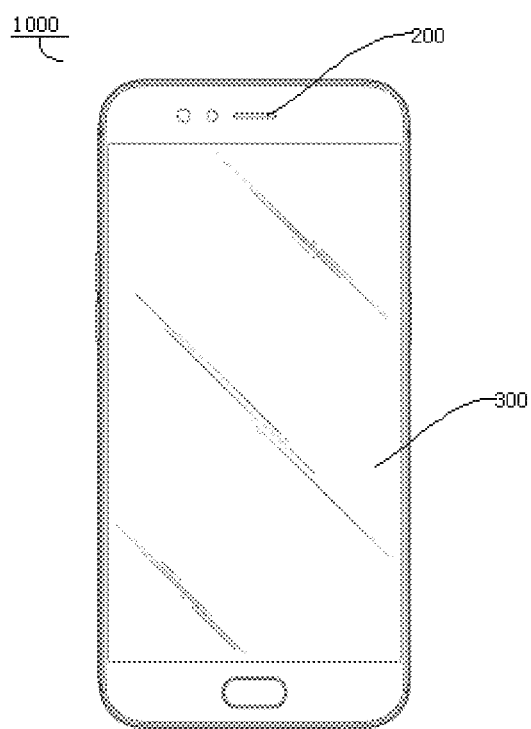
FIG. 9 is a structure diagram of an electronic device according to an embodiment of the disclosure.

Further, as illustrated in FIG. 5 and FIG. 8, a cross-sectional shape of the coil 2 is the same as that of the dust-proof screen 4, and a cross-sectional area of the coil 2 is the same as that of the dust-proof screen 4. Therefore, the brush head 3 may be reasonably disposed in the coil 2, so that the brush head 3 may clean each corner of the dust-proof screen 4 to avoid the phenomenon of hole clogging in some part of the dust-proof screen 4, thereby avoiding further manual cleaning, improving the quality of the electronic device 1000, and reducing after-sales costs.

Furthermore, as illustrated in FIG. 1, the cross-sectional shape of the dust-proof screen 4 is oblong. Correspondingly, as illustrated in FIG. 8, the cross-sectional shape of the coil 2 is oblong. Since the existing electronic device 1000 tends to be light and thin, the dust-proof screen 4 is set to be oblong, which is advantageous for the light and thin development of the electronic device 1000. Moreover, the oblong dust-proof screen 4 is relatively attractive and takes up little space, and the appearance of the electronic device 1000 is improved.

It is to be noted that "oblong" may be defined as: a circle formed by selecting two points on the same diameter on a circle or selecting two arcs symmetric about the center of the circle, and stretching the circle along a straight line or an arc. For example, the oblong may be an oblong as illustrated in FIG. 1 and FIG. 8, and of course, the oblong may be formed in an ellipse.

Of course, the disclosure is not limited thereto, and the cross-sectional shape of the dust-proof screen 4 may also be a circle, an ellipse, a polygon (for example, a rectangle), or the like. Correspondingly, the cross-sectional shape of the coil 2 is a shape matched with the cross-sectional shape of the dust-proof screen 4. Therefore, the purpose of thoroughly cleaning the dust-proof screen 4 by the brush head 3 may be achieved, and the cleanliness of the dust-proof screen 4 may be improved.

Figure 2:
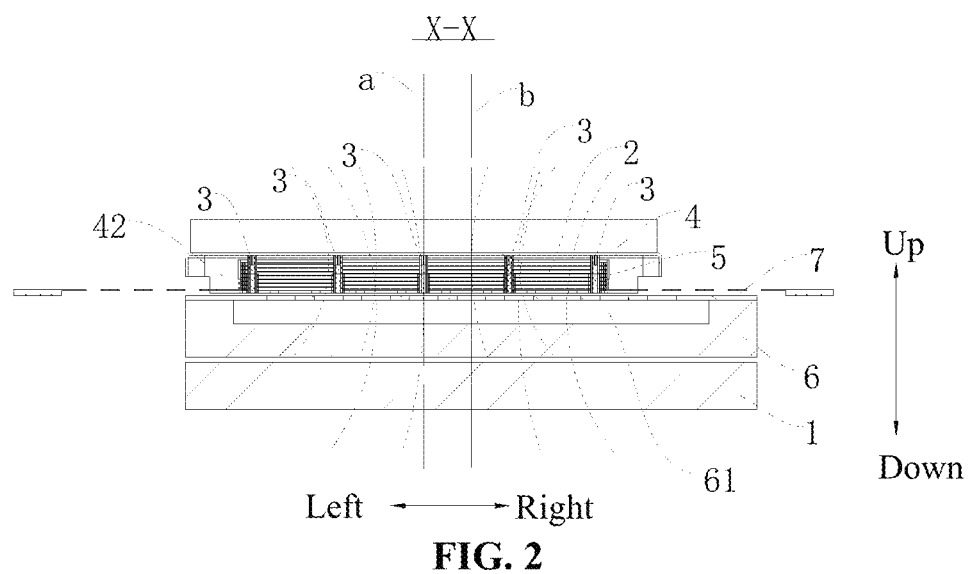
FIG. 2 is a cross-sectional view taken along a line X-X in FIG. 1.

In some embodiments of the disclosure, as illustrated in FIG. 2, the central line a of the coil 2 is spaced from the central line b of the magnet 1 by a predetermined distance. That is to say, the central line a of the coil 2 and the central line b of the magnet 1 are spaced apart. For example, in the example illustrated in FIG. 2, in the length direction of the magnet 1 (left-right direction illustrated in FIG. 2), the center line a of the coil 2 is offset from the center line b of the magnet 1, and the center line a of the coil 2 is offset leftwards from the center line b of the magnet 1.

When the coil 2 is at an initial position, a connecting line between the center line of the coil 2 and the center line of the magnet 1 is a straight line m, and the straight line m is perpendicular to both the center line a of the coil 2 and the center line b of the magnet 1. When the direction of the second magnetic field is opposite to the direction of the first magnetic field, the coil 2 moves not only toward the direction away from the magnet 1 (that is, toward the dust-proof screen 4), but also moves in the direction of the straight line m. The center line a of the coil 2 moves from one side of the center line b of the magnet 1 to the other side of the center line b of the magnet 1, then moves from the other side of the center line b of the magnet 1 to said one side of the center line b of the magnet 1, and reciprocates. Correspondingly, the brush head 3 may reciprocate in the direction of the straight line m on the dust-proof screen 4, thereby facilitating the cleaning of the dust-proof screen 4 and preventing the dust-proof screen 4 from being clogged.

For example, in the examples illustrated in FIG. 1 and FIG. 2, when the direction of the second magnetic field is opposite to the direction of the first magnetic field, the coil 2 may move not only upwards, the coil 2 but also moves rightwards and then leftwards, thereby achieving the reciprocation of the coil 2. Correspondingly, the brush head 3 reciprocates in the left-right direction, so that the cleaning of the dust-proof screen 4 by the brush head 3 is realized, and the dust-proof screen 4 is prevented from being clogged.

Further, as illustrated in FIG. 2 and FIG. 5, the length of the coil 2 is smaller than the length of the dust-proof screen 4. Therefore, when the coil 2 moves, it is possible to prevent the partial brush head 3 in the coil 2 from moving to the outside of the dust-proof screen 4. The part of brush head 3 located outside the dust-proof screen 4 does not contribute to the cleaning of the dust-proof screen 4, and also increases the cost. The length of the coil 2 is set to be smaller than the length of the dust-proof screen 4, the brush head 3 in the coil 2 may always clean the dust-proof screen 4, materials may be saved, and the cost may be reduced.

Further, the width of the coil 2 is equal to the width of the dust-proof screen 4. Therefore, in the width direction of the dust-proof screen 4, the brush head 3 in the coil 2 may clean dust on the dust-proof screen 4, and the existence of a part that cannot be cleaned by the brush head 3 in the width direction of the dust-proof screen 4 is avoided, thereby ensuring the cleanliness of the dust-proof screen 4.

Figure 3:
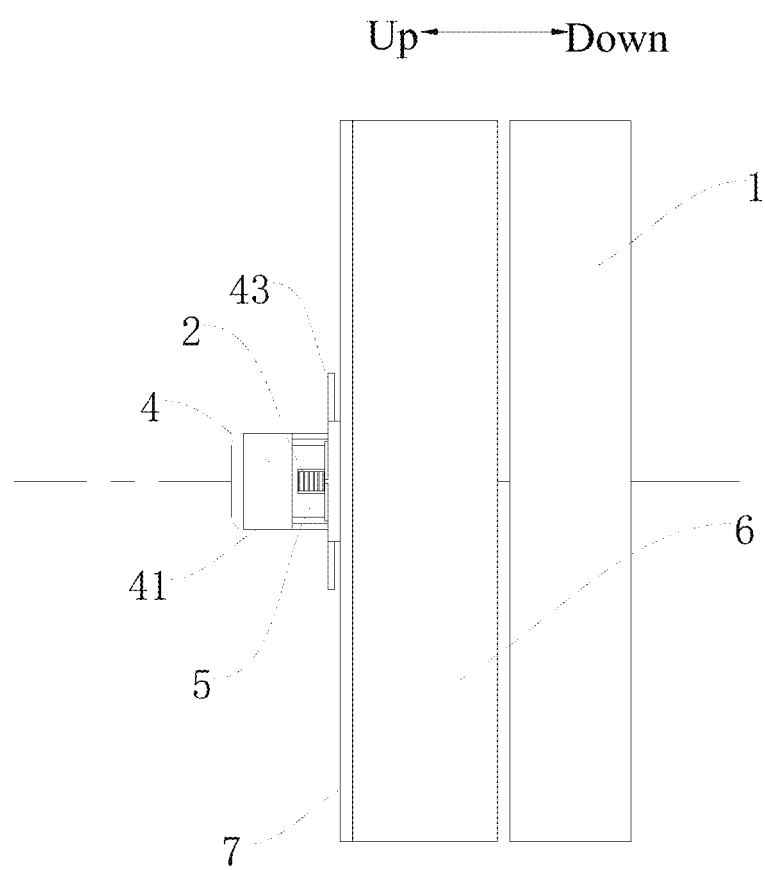
FIG. 3 is a right view of an electroacoustic assembly according to an embodiment of the disclosure.
Figure 4:
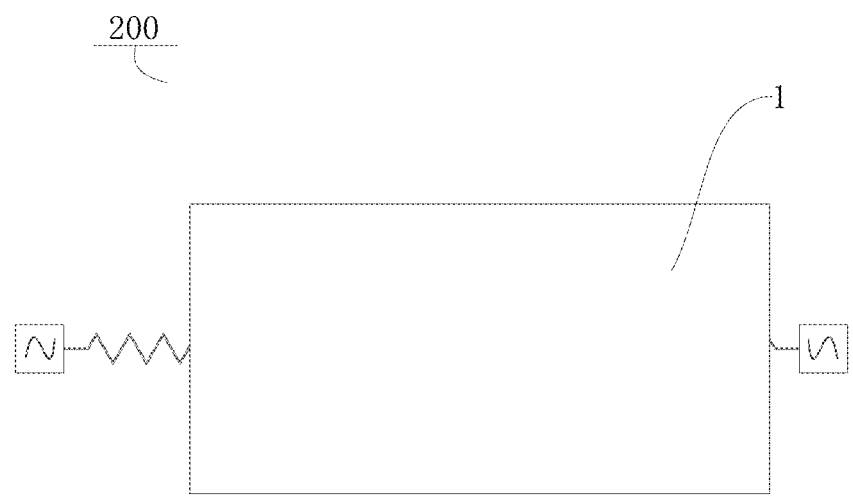
FIG. 4 is a bottom view of an electroacoustic assembly according to an embodiment of the disclosure.

In some embodiments of the disclosure, as illustrated in FIG. 3 and FIG. 5, a baffle 41 extending toward the coil 2 is disposed at an edge of the dust-proof screen 4, the baffle 41 and the dust-proof screen 4 define a mounting space 42, and the coil 2 is located in the mounting space 42. On one hand, the baffle 41 may play a role in fixing the coil 2. On the other hand, the baffle 41 may play a role in guidance, and the coil 2 may move along an inner side wall of the baffle 41.

Further, as illustrated in FIG. 5, there is one baffle 41, and the baffle 41 extends in the circumferential direction of the dust-proof screen 4. Therefore, the structure and the processing process may be simplified, the production cycle may be saved, and the production cost may be reduced. Furthermore, the cross section of the baffle 41 is annular. That is to say, the baffle 41 extending toward the coil 2 is provided at the outer peripheral edge of the dust-proof screen 4, whereby the coil 2 may be firmly defined in the mounting space 42, and the coil 2 may be better guided.

Of course, the disclosure is not limited thereto, and there may be multiple baffles 41. The multiple baffles 41 are spaced apart from each other in the circumferential direction of the dust-proof screen 4. Therefore, not only the coil 2 may be fixed and guided, but also materials may be saved and the cost may be reduced.

In some embodiments of the disclosure, as illustrated in FIG. 3 and FIG. 5, a free end of the baffle 41 (a lower end as illustrated in FIG. 5) is provided with a mounting portion 43. The mounting portion 43 is connected to the magnet 1. Therefore, the reliability of the connection between the dust-proof screen 4 and the magnet 1 may be increased, so that the coil 2 may be fixed between the dust-proof screen 4 and the magnet 1, and the brush head 3 in the coil 2 may conveniently clean the dust-proof screen 4. For example, in the examples illustrated in FIG. 3 and FIG. 5, the free end of the baffle 41 on the long side of the dust-proof screen 4 is provided with a mounting portion 43. The mounting portion 43 is perpendicular to the baffle 41, and the mounting portion 43 extends in the length direction of the dust-proof screen 4 (the left-right direction as illustrated in FIG. 5), the mounting portion 43 is parallel to the surface of the magnet 1, and the surface of the mounting portion 43 opposite to the magnet 1 is connected to the magnet 1.

In some embodiments of the disclosure, there is one brush head 3, and the brush head 3 fills in a chamber defined by the coil 2. That is to say, there is one brush head 3, and the cross-sectional shape of the brush head 3 is the same as that of the chamber defined by the coil 2, the cross-sectional area of the brush head 3 is the same as that of the chamber defined by the coil 2. Therefore, the cleaning speed of the dust-proof screen 4 by the brush head 3 may be increased, the cleaning efficiency of the brush head 3 may be improved, and time may be saved.

Of course, the disclosure is not limited thereto. As illustrated in FIG. 5 and FIG. 6 to FIG. 8, there are multiple brush heads 3, and the multiple brush heads 3 are spaced apart from each other. Therefore, the arrangement of the brush head 3 is facilitated, the structure of the dust-proof screen assembly 100 is simplified, the production cycle is saved, and the production cost is reduced.

In some embodiments of the disclosure, as illustrated in FIG. 5 to FIG. 8, the dust-proof screen assembly 100 further includes a bracket 5. The bracket 5 is mounted around the coil 2, and the bracket 5 may play a role in fixing the coil 2. As illustrated in FIG. 5, the cross section of the bracket 5 is oblong, and the coil 2 is fixed in the bracket 5. Further, the bracket 5 is a metal bracket 5. The metal bracket 5 facilitates the movement of the coil 2.

Further, as illustrated in FIG. 5 and FIG. 6, the bracket 5 is provided with at least one slot 51 through which a winding of the coil 2 passes. Both ends of the winding of the coil 2 pass through the slot 51, so that the lower end surface of the bracket 5 (the lower end surface illustrated in FIG. 6) may be in contact with a member connected thereto to avoid the unreliability of fixing of the bracket 5, thereby ensuring the correctness of the movement trajectory of the coil 2 in the bracket 5, and further improving the reliability of cleaning the dust-proof screen 4.

Furthermore, as illustrated in FIG. 5 and FIG. 6, there are two slots 51. Therefore, both ends of the winding may respectively pass through the two slots 51 to facilitate the arrangement of the winding. Still further, as illustrated in FIG. 5 and FIG. 6, the two slots 51 are opposed to each other, thereby further facilitating the arrangement of the winding. Of course, the disclosure is not limited thereto, there may be one slot 51, and both ends of the winding of the coil 2 may pass through the slot 51.

An electroacoustic assembly 200 of an electronic device 1000 according to an embodiment of the disclosure will be described below with reference to the descriptions of FIG. 1 to FIG. 9.

As illustrated in FIG. 1 to FIG. 9, the electroacoustic assembly 200 of an electronic device 1000 according to an embodiment of the disclosure includes the above dust-proof screen assembly 100 and a vibrating assembly 6.

Specifically, the vibrating assembly 6 is located between the magnet 1 and the coil 2. The cross-sectional shape and cross-sectional area of the vibrating assembly 6 are the same as the cross-sectional shape and cross-sectional area of the magnet 1, and an end face of the vibrating assembly 6 facing toward the coil 2 is provided with a groove 61. The bottom wall of the groove 61 may be a film capable of vibrating, and the film is connected to a small coil.

When the electroacoustic assembly is a microphone assembly, the film will vibrate when someone speaks to the film. The film is connected to a small coil, and the microphone assembly has a fixed permanent magnet. When the film vibrates, the coil is driven to vibrate, and a relative position between the coil and the permanent magnet changes, which causes the magnetic field passing through the coil to change. When the magnetic field changes, an induced electromotive force is generated in the coil, and thus a current is generated. A particular sound has a specific vibration that produces a specific form of current. So the microphone "codes" the sound into a form of current.

When the electroacoustic assembly is an earphone, the principle of the earphone is probably the reverse process of the microphone, and the structure is almost the same. There is also a film in the earphone, the film is connected to a coil, and there is also a permanent magnet. A specific form of current (such as the current that is just "coded" by the microphone) flows through the coil of the earphone, which causes the magnetic field generated by the coil to change, so the magnetic force between the permanent magnet and the coil changes, and the distance between the permanent magnet and the coil will change. This drives the film to vibrate and make a sound.

It is to be noted that the electroacoustic assembly is not limited to the earphone or the microphone, and may be other structures such as a speaker and a microphone. It is to be noted that the permanent magnet in the electroacoustic assembly 200 may be the above magnet 1 or may be a permanent magnet separately disposed.

The composition and principle of the vibrating assembly 6 according to an embodiment of the disclosure are both known to those of ordinary skill in the art and will not be described in detail herein.

The electroacoustic assembly 200 of an electronic device 1000 according to an embodiment of the disclosure is provided with the magnet 1 and the coil 2 disposed on one side of the magnet 1. The brush head 3 connected to the coil 2 is disposed in the coil 2. The dust-proof screen 4 is disposed on one side of the coil 2 away from the magnet 1. The magnet 1 has the first magnetic field, and the coil 2 is adapted to generate the second magnetic field. When the direction of the second magnetic field is opposite to the direction of the first magnetic field, the coil 2 moves toward the dust-proof screen 4, and the brush head 3 is adapted to contact with the dust-proof screen 4. When the direction of the second magnetic field is the same as the direction of the first magnetic field, the coil 2 moves toward the magnet 1. Therefore, the movement of the brush head 3 may be realized by changing the direction of the second magnetic field. When the brush head 3 is in contact with the dust-proof screen 4, the brush head 3 may clean the dust-proof screen 4 from inside to outside, the brush head 3 may reciprocate in the vertical direction to achieve the purpose of thoroughly cleaning the dust-proof screen 4, thereby avoiding the phenomenon of hole clogging, and improving the quality of an electronic device 1000 while avoiding manual cleaning of the dust-proof screen 4 and reducing after-sales costs.

In some embodiments of the disclosure, as illustrated in FIG. 5 and FIG. 2, the electroacoustic assembly 200 further includes a limiting member 7. The limiting member 7 is located at an opening of the groove 61 and connected to the vibrating assembly 6. The limiting member 7 may support the coil 2 to prevent the coil 2 from falling into the groove 61 of the vibrating assembly 6.

Further, as illustrated in FIG. 5 and FIG. 2, the limiting member 7 covers the opening of the groove 61. Therefore, the limiting member 7 may block the opening of the groove 61 to prevent the coil 2 from falling into the groove 61, thereby improving the reliability of the operation of the coil 2. For example, in the examples illustrated in FIG. 5 and FIG. 2, the cross-sectional shape and area of the limiting member 7 are the same as the cross-sectional shape and area of the vibrating assembly 6, and the limiting member 7 completely covers the opening of the groove 61, whereby it is possible to prevent the coil 2 from falling into the groove 61.

Furthermore, as illustrated in FIG. 5, the limiting member 7 is provided with multiple through holes 71 spaced apart from each other. Therefore, sound generated in the vibrating assembly 6 may pass through the through holes 71 to the outside of the dust-proof screen 4 to increase the volume.

An electroacoustic assembly 200 of an electronic device 1000 according to a specific embodiment of the disclosure will be described below with reference to the descriptions of FIG. 1 to FIG. 9. It is to be understood that the following description is only illustrative, is intended to explain the disclosure, and cannot be construed as limiting the disclosure. The electronic device 1000 to which the disclosure is applied will be described by taking a mobile phone as an example. In the embodiment of the disclosure, the mobile phone may include a radio frequency circuit, a memory, an input unit, a Wireless Fidelity (WiFi) module, a display unit, a sensor, an audio circuit, a processor, a projection unit, a photographing unit, a battery, and the like.

It is to be noted that the mobile phone is only an example of the electronic device 1000, and the disclosure is not limited thereto. The disclosure may be applied to an electronic device 1000 such as a mobile phone or a tablet computer, which is not limited by the disclosure.

Specifically, as illustrated in FIG. 1 to FIG. 9, the electroacoustic assembly 200 of an electronic device 1000 according to an embodiment of the disclosure includes a dust-proof screen assembly 100 and a vibrating assembly 6. The dust-proof screen assembly 100 includes a magnet 1, a coil 2, a brush head 3, a bracket 5, and a dust-proof screen 4. The vibrating assembly 6 is disposed between the magnet 1 and the coil 2.

As illustrated in FIG. 1 to FIG. 8, the magnet 1 has a rectangular parallelepiped shape, the magnet 1 has a first magnetic field, the coil 2 is located on one side of the magnet 1 (upper side as illustrated in FIG. 5), and the coil 2 is adapted to generate a second magnetic field. The brush head 3 is disposed in the coil 2 and connected to the coil 2, and an upper end face of the brush head 3 extends beyond an upper end face of the coil 2. The dust-proof screen 4 is located on one side of the coil 2 away from the magnet 1 (upper side as illustrated in FIG. 5).

When the direction of the second magnetic field and the direction of the first magnetic field are opposite, the coil 2 moves toward the dust-proof screen 4, and the brush head 3 is suitable for making contact with the dust-proof screen 4. When the direction of the second magnetic field is the same as the direction of the first magnetic field, the coil 2 moves toward the magnet 1. Therefore, the movement of the brush head 3 may be realized by changing the direction of the second magnetic field, for example, the movement in an vertical direction as illustrated in FIG. 5. When the brush head 3 is in contact with the dust-proof screen 4, the brush head 3 may clean the dust-proof screen 4 in the vertical direction. The brush head 3 may reciprocate in the vertical direction to achieve the purpose of thoroughly cleaning the dust-proof screen 4, thereby avoiding the phenomenon of hole clogging, improving the quality of the electronic device 1000, and reducing after-sales costs.

It is to be noted that the second magnetic field generated by the coil 2 may be generated by supplying the coil 2 with a current. When the current is supplied to the coil 2 and the current flows in a first direction, the direction of the second magnetic field is opposite to the direction of the first magnetic field. When the current is supplied to the coil 2 and the current flows in a second direction opposite to the second direction, the direction of the second magnetic field is the same as the direction of the first magnetic field.

As illustrated in FIG. 1 and FIG. 2, the central line a of the coil 2 is spaced from the central line b of the magnet 1 by a predetermined distance. That is to say, the central line a of the coil 2 and the central line b of the magnet 1 are spaced apart. For example, as illustrated in FIG. 2, the central line a of the coil 2 is deviated leftwards from the central line b of the magnet 1. When the direction of the second magnetic field is opposite to the direction of the first magnetic field, the coil 2 may move not only upwards, but the coil 2 but also moves rightwards and then leftwards, thereby achieving the reciprocation of the coil 2. Correspondingly, the brush head 3 reciprocates in the left-right direction, so that the cleaning of the dust-proof screen 4 by the brush head 3 is realized, and the dust-proof screen 4 is prevented from being clogged.

Further, as illustrated in FIG. 2 and FIG. 5, the length of the coil 2 is smaller than the length of the dust-proof screen 4. Therefore, when the coil 2 moves, it is possible to prevent a part of the brush head 3 in the coil 2 from moving to the outside of the dust-proof screen 4. The part of the brush head 3 located outside the dust-proof screen 4 does not contribute to the cleaning of the dust-proof screen 4, and also increases the cost, the length of the coil 2 is set to be smaller than the length of the dust-proof screen 4, the brush head 3 in the coil 2 may always clean the dust-proof screen 4, materials may be saved, and the cost may be reduced.

Further, the width of the coil 2 is equal to the width of the dust-proof screen 4. Therefore, in the width direction of the dust-proof screen 4, the brush head 3 in the coil 2 may clean dust on the dust-proof screen 4, and the existence of a part that cannot be cleaned by the brush head 3 in the width direction of the dust-proof screen 4 is avoided, thereby ensuring the cleanliness of the dust-proof screen 4.

As illustrated in FIG. 3 and FIG. 5, a baffle 41 extending toward the coil 2 is disposed at an edge of the dust-proof screen 4. The baffle 41 and the dust-proof screen 4 define a mounting space 42, and the coil 2 is located in the mounting space 42. On the one hand, the baffle 41 may play a role in fixing the coil 2. On the other hand, the baffle 41 may play a role in guidance, and the coil 2 may move along an inner side wall of the baffle 41.

Further, as illustrated in FIG. 5, there is one baffle 41, and the baffle 41 extends in the circumferential direction of the dust-proof screen 4. Therefore, the structure and the processing process may be simplified, the production cycle may be saved, and the production cost may be reduced. Furthermore, the cross section of the baffle 41 is annular. That is to say, the baffle 41 extending toward the coil 2 is provided at the outer peripheral edge of the dust-proof screen 4, whereby the coil 2 may be firmly defined in the mounting space 42, and the coil 2 may be better guided.

As illustrated in FIG. 3 and FIG. 5, the free end of the baffle 41 on the long side of the dust-proof screen 4 is provided with a mounting portion 43. The mounting portion 43 is perpendicular to the baffle 41, and the mounting portion 43 extends in the length direction of the dust-proof screen 4 (the left-right direction as illustrated in FIG. 5). The mounting portion 43 is parallel to the surface of a limiting member 7, and the surface of the mounting portion 43 opposite to the limiting member 7 is connected to the limiting member.

As illustrated in FIG. 5, FIG. 6 and FIG. 8, there are multiple brush heads 3, and the multiple brush heads 3 are spaced apart from each other. Therefore, the arrangement of the brush head 3 is facilitated, the structure of the dust-proof screen assembly 100 is simplified, the production cycle is saved, and the production cost is reduced.

As illustrated in FIG. 5 to FIG. 8, the bracket 5 is mounted around the coil 2, and the bracket 5 may play a role in fixing the coil 2. As illustrated in FIG. 5, the cross section of the bracket 5 is oblong, and the coil 2 is fixed in the bracket 5. Further, the bracket 5 is a metal bracket 5. The metal bracket 5 facilitates the movement of the coil 2. Further, as illustrated in FIG. 5 and FIG. 6, the bracket 5 is provided with at least one slot 51 through which a winding of the coil 2 passes. There are two slots 51 and the two slots 51 are opposite to each other. Therefore, both ends of the winding may respectively pass through the two slots 51 to facilitate the arrangement of the winding.

As illustrated in FIG. 1 to FIG. 8, the cross-sectional shape and cross-sectional area of the vibrating assembly 6 are the same as the cross-sectional shape and cross-sectional area of the magnet 1, and an end face of the vibrating assembly 6 facing toward the coil 2 is provided with a groove 61. The bottom wall of the groove 61 may be a film capable of vibrating, and the film is connected to a small coil.

When the electroacoustic assembly is a microphone assembly, the film will vibrate when someone speaks to the film. The film is connected to a small coil, and the microphone assembly has a fixed permanent magnet. When the film vibrates, the coil is driven to vibrate, and a relative position between the coil and the permanent magnet changes, which causes the magnetic field passing through the coil to change. When the magnetic field changes, an induced electromotive force is generated in the coil, and thus a current is generated. A particular sound has a specific vibration that produces a specific form of current. So the microphone "codes" the sound into a form of current.

When the electroacoustic assembly is an earphone, the principle of the earphone is probably the reverse process of the microphone, and the structure is almost the same. There is also a film in the earphone, the film is connected to a coil, and there is also a permanent magnet. A specific form of current (such as the current that is just "coded" by the microphone) flows through the coil of the earphone, which causes the magnetic field generated by the coil to change, so the magnetic force between the permanent magnet and the coil changes, and the distance between the permanent magnet and the coil will change. This drives the film to vibrate and make a sound.

It is to be noted that the electroacoustic assembly is not limited to the earphone or the microphone, and may be other structures such as a speaker and a microphone. It is to be noted that the permanent magnet in the electroacoustic assembly 200 may be the above magnet 1 or may be a permanent magnet separately disposed.

As illustrated in FIG. 3 and FIG. 5, the electroacoustic assembly 200 further includes a limiting member 7. The limiting member 7 covers an opening of the groove 61. The limiting member 7 is provided with multiple through holes 71 spaced apart from each other. The limiting member 7 may support the coil 2 to prevent the coil 2 from falling into the groove 61 of the vibrating assembly 6. Sound generated in the vibrating assembly 6 passes through the through holes 71 to the outside of the dust-proof screen 4 to increase the volume.

A housing assembly 300 of an electronic device 1000 according to an embodiment of the disclosure will be described below with reference to the descriptions of FIG. 1 to FIG. 9.

As illustrated in FIG. 1 to FIG. 9, the housing assembly 300 of an electronic device 1000 according to an embodiment of the disclosure includes the above electroacoustic assembly 200 of an electronic device 1000.

The housing assembly 300 of an electronic device 1000 according to an embodiment of the disclosure is provided with the magnet 1 and the coil 2 disposed on one side of the magnet 1. The brush head 3 connected to the coil 2 is disposed in the coil 2. The dust-proof screen 4 is disposed on one side of the coil 2 away from the magnet 1. The magnet 1 has the first magnetic field, and the coil 2 is adapted to generate the second magnetic field. When the direction of the second magnetic field is opposite to the direction of the first magnetic field, the coil 2 moves toward the dust-proof screen 4, and the brush head 3 is adapted to contact with the dust-proof screen 4. When the direction of the second magnetic field is the same as the direction of the first magnetic field, the coil 2 moves toward the magnet 1. Therefore, the movement of the brush head 3 may be realized by changing the direction of the second magnetic field. When the brush head 3 is in contact with the dust-proof screen 4, the brush head 3 may clean the dust-proof screen 4 from inside to outside, the brush head 3 may reciprocate in the vertical direction to achieve the purpose of thoroughly cleaning the dust-proof screen 4, thereby avoiding the phenomenon of hole clogging, and improving the quality of an electronic device 1000 while avoiding manual cleaning of the dust-proof screen 4 and reducing after-sales costs.

An electronic device 1000 according to an embodiment of the disclosure will be described below with reference to the descriptions of FIG. 1 to FIG. 9.

As illustrated in FIG. 1 to FIG. 9, the electronic device 1000 according to an embodiment of the disclosure includes the above housing assembly 300 of an electronic device 1000.

The electronic device 1000 according to an embodiment of the disclosure is provided with the magnet 1 and the coil 2 disposed on one side of the magnet 1. The brush head 3 connected to the coil 2 is disposed in the coil 2. The dust-proof screen 4 is disposed on one side of the coil 2 away from the magnet 1. The magnet 1 has the first magnetic field, and the coil 2 is adapted to generate the second magnetic field. When the direction of the second magnetic field is opposite to the direction of the first magnetic field, the coil 2 moves toward the dust-proof screen 4, and the brush head 3 is adapted to contact with the dust-proof screen 4. When the direction of the second magnetic field is the same as the direction of the first magnetic field, the coil 2 moves toward the magnet 1. Therefore, the movement of the brush head 3 may be realized by changing the direction of the second magnetic field. When the brush head 3 is in contact with the dust-proof screen 4, the brush head 3 may clean the dust-proof screen 4 from inside to outside, the brush head 3 may reciprocate in the vertical direction to achieve the purpose of thoroughly cleaning the dust-proof screen 4, thereby avoiding the phenomenon of hole clogging, and improving the quality of an electronic device 1000 while avoiding manual cleaning of the dust-proof screen 4 and reducing after-sales costs.

In some embodiments of the disclosure, the electronic device 1000 is a mobile phone, a tablet computer or a notebook computer.

As used herein, "electronic device 1000" includes, but is not limited to, is configured as an apparatus connected via a wired line (for example, a Public Switched Telephone Network (PSTN), a Digital Subscriber Line (DSL), a digital cable, a direct cable, and/or another data connection/network) and/or an apparatus for receiving/sending a communication signal via a wireless interface (for example, for a cellular network, a Wireless Local Area Network (WLAN), a digital television network such as a DVB-H network, a satellite network, an AM-FM broadcast sender, and/or another communication terminal). A communication terminal configured to communicate over a wireless interface may be referred to as "wireless communication device," "wireless device," and/or "mobile device." Examples of the electronic device 1000 include, but are not limited to: satellite or cellular telephones; Personal Communication System (PCS) terminals that may combine cellular radiotelephone with data processing, fax, and data communication capabilities; PDAs, which may include radiotelephones, pagers, Internet/intranet connections, web browsers, memo pads, calendars, and/or Global Positioning System (GPS) receivers; and conventional laptop and/or palmtop receivers or other electronic devices including radiotelephone transceivers.

In the descriptions of the specification, the descriptions made with reference to terms "one embodiment", "some embodiments", "exemplary embodiments", "example", "specific example", "some examples" or the like refer to that specific features, structures, materials or characteristics described in combination with the embodiment or the example are included in at least one embodiment or example of the present invention. In the present specification, the schematic representation of the above terms does not necessarily mean the same embodiment or example. Furthermore, the specific features, structures, materials, or characteristics described may be combined in a suitable manner in any one or more embodiments or examples.

While the embodiments of the disclosure have been illustrated and described, those of ordinary skill in the art may understand that various modifications, changes, substitutions and variations of the embodiments may be made without departing from the spirit and scope of the disclosure. The scope of the disclosure is defined by the claims and their equivalents.

What is claimed is:

1. A dust-proof screen assembly, comprising:
a magnet, having a first magnetic field;
a coil, located on one side of the magnet and configured to generate a second magnetic field;
a brush head, disposed in the coil and connected to the coil, an end face of the brush head extending beyond an end face of the coil; and
a dust-proof screen, located on one side of the coil away from the magnet,
wherein when the direction of the second magnetic field is opposite to the direction of the first magnetic field, the coil moves toward the dust-proof screen, and the brush head is adapted to contact with the dust-proof screen; and when the direction of the second magnetic field is the same as the direction of the first magnetic field, the coil moves toward the magnet.

2. The dust-proof screen assembly according to claim 1, wherein a central line of the coil coincides with a central line of the magnet.

3. The dust-proof screen assembly according to claim 2, wherein a cross-sectional shape of the coil is the same as that of the dust-proof screen, and a cross-sectional area of the coil is the same as that of the dust-proof screen.

4. The dust-proof screen assembly according to claim 3, wherein the cross-sectional shape of the dust-proof screen is oblong.

5. The dust-proof screen assembly according to claim 1, wherein the central line of the coil is spaced from the central line of the magnet by a predetermined distance.

6. The dust-proof screen assembly according to claim 5, wherein the length of the coil is smaller than the length of the dust-proof screen.

7. The dust-proof screen assembly according to claim 5, wherein the width of the coil is equal to the width of the dust-proof screen.

8. The dust-proof screen assembly according to claim 1, wherein a baffle extending toward the coil is disposed at an edge of the dust-proof screen, the baffle and the dust-proof screen define a mounting space, and the coil is located in the mounting space.

9. The dust-proof screen assembly according to claim 8, wherein there is one baffle, and the baffle extending in a circumferential direction of the dust-proof screen.

10. The dust-proof screen assembly according to claim 9, wherein the cross section of the baffle is annular.

11. The dust-proof screen assembly according to claim 8, wherein there are multiple baffles spaced apart from each other in the circumferential direction of the dust-proof screen.

12. The dust-proof screen assembly according to claim 8, wherein a free end of the baffle is provided with a mounting portion that is connected to the magnet.

13. The dust-proof screen assembly according to claim 1, wherein there is one brush head, and the brush head fills in a chamber defined by the coil; or
there are multiple brush heads spaced apart from each other.

14. The dust-proof screen assembly according to claim 1, further comprising a bracket, the bracket being mounted around the coil.

15. The dust-proof screen assembly according to claim 14, wherein the bracket is provided with at least one slot through which a winding of the coil passes.

16. An electroacoustic assembly of an electronic device, comprising:
a dust-proof screen assembly; and
a vibrating assembly disposed between the magnet and the coil, an end face of the vibrating assembly facing toward the coil being provided with a groove,
wherein the dust-proof screen assembly comprises:
a magnet, having a first magnetic field;
a coil, located on one side of the magnet and configured to generate a second magnetic field;
a brush head, disposed in the coil and connected to the coil, an end face of the brush head extending beyond an end face of the coil; and
a dust-proof screen, located on one side of the coil away from the magnet,
wherein when the direction of the second magnetic field is opposite to the direction of the first magnetic field, the coil moves toward the dust-proof screen, and the brush head is adapted to contact with the dust-proof screen; and when the direction of the second magnetic field is the same as the direction of the first magnetic field, the coil moves toward the magnet.

17. The electroacoustic assembly of an electronic device according to claim 16, further comprising a limiting member located at an opening of the groove and connected to the vibrating assembly.

18. The electroacoustic assembly of an electronic device according to claim 17, wherein the limiting member covers the opening of the groove.

19. The electroacoustic assembly of an electronic device according to claim 17, wherein the limiting member is provided with multiple through holes spaced apart from each other.

20. A housing assembly of an electronic device, comprising an electroacoustic assembly of an electronic device,
wherein the electronic device comprises:
a dust-proof screen assembly; and
a vibrating assembly disposed between the magnet and the coil, an end face of the vibrating assembly facing toward the coil being provided with a groove,
wherein the dust-proof screen assembly comprises:
a magnet, having a first magnetic field;
a coil, located on one side of the magnet and configured to generate a second magnetic field;

a brush head, disposed in the coil and connected to the coil, an end face of the brush head extending beyond an end face of the coil; and a dust-proof screen, located on one side of the coil away from the magnet, and wherein when the direction of the second magnetic field is opposite to the direction of the first magnetic field, the coil moves toward the dust-proof screen, and the brush head is adapted to contact with the dust-proof screen; and when the direction of the second magnetic field is the same as the direction of the first magnetic field, the coil moves toward the magnet.

\* \* \* \* \*